United States Patent [19]

Fukuyama et al.

[11] Patent Number: 4,496,889
[45] Date of Patent: Jan. 29, 1985

[54] METHOD OF DIAGNOSING A SERVOMOTOR CONTROL CIRCUIT

[75] Inventors: Hiroomi Fukuyama, Hachioji; Shinichi Isobe, Hino, both of Japan

[73] Assignee: Fanuc Ltd., Minamitsuru, Japan

[21] Appl. No.: 442,425

[22] Filed: Nov. 17, 1982

[30] Foreign Application Priority Data

Nov. 25, 1981 [JP] Japan .................................. 56-188597

[51] Int. Cl.³ .............................................. G05B 23/02
[52] U.S. Cl. ..................................... 318/565; 318/600
[58] Field of Search ................................ 318/565, 600

[56] References Cited

U.S. PATENT DOCUMENTS

| | | | |
|---|---|---|---|
| 3,576,979 | 5/1971 | McCall | 318/565 X |
| 3,633,087 | 1/1972 | Vawter et al. | 318/565 |
| 3,934,185 | 1/1976 | Schoonover et al. | 318/565 |
| 4,130,787 | 12/1978 | Allaire et al. | 318/565 |
| 4,268,783 | 5/1981 | Murray | 318/565 |
| 4,272,711 | 6/1981 | Fukuyama et al. | 318/565 |

Primary Examiner—B. Dobeck
Attorney, Agent, or Firm—Staas & Halsey

[57] ABSTRACT

A method of diagnosing a servomotor position control circuit which includes a pulse distributor for carrying out arithmetic operations for pulse distribution based on command data given by a control unit, a position detector for generating a positional pulse each time the servomotor rotates through a predetermined angular interval, an error storage unit for computing and storing the difference between the number of positional pulses generated by the position detector and the number of distributed pulses generated by the pulse distributor, and a D/A converter for converting the difference into an analog output, whereby the servomotor is controlled by the analog output from the D/A converter. The method comprises the steps of supplying a numerical value from the control unit to the pulse distributor to enable the latter to effect the arithmetic operations while the servomotor is being de-energized, reading a stored content of the error storage unit, supplied with the distributed pulses from the pulse distributor, into the control unit, and checking the servomotor position control circuit for normal and malfunctioning conditions by comparing the stored content as read by the control unit with the numerical value.

8 Claims, 2 Drawing Figures

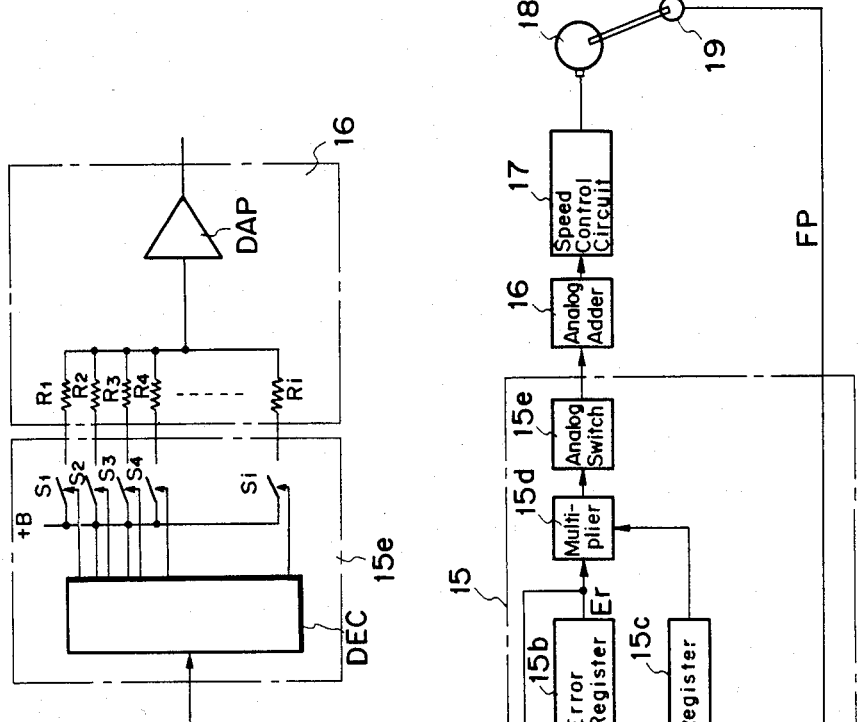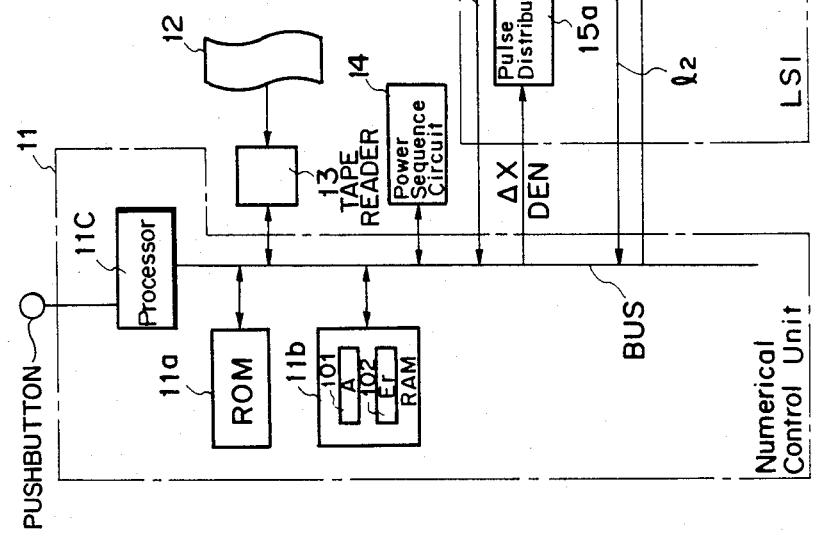

METHOD OF DIAGNOSING A SERVOMOTOR CONTROL CIRCUIT

BACKGROUND OF THE INVENTION

The present invention relates to a method of diagnosing a circuit for controlling a servomotor to check the circuit for any malfunctions, and more particularly to a method of diagnosing a servomotor control circuit for any malfunction in an LSI (Large-Scale Integration) circuit which constitutes a digital circuit in the servomotor control circuit.

It has been a general practice to employ a numerical control system for controlling a servomotor of a movable mechanism of a machine tool and the like in actuating the movable mechanism. The numerical control system has, in addition to a numerical control unit, a positional control circuit which mainly comprises a pulse distributor for carrying out arithmetic operations for pulse distribution based on positional or path data, a position detector such as a pulse coder for generating a positional pulse each time the servomotor rotates through a predetermined angular interval, an error register for computing and storing the difference (hereinafter referred to as an "error") between the number of distributed pulses produced by the pulse distributor and the number of positional pulses, a digital-to-analog converter (hereinafter referred to as a "D/A converter") for converting the error into an analog quantity, and a speed control circuit for driving the servomotor in response to an output from the D/A converter. The positional control circuit thus serves to drive the servomotor in response to the output from the D/A converter to position a tool or table in a commanded location or move the tool or table along a commanded path for performing desired machining on a workpiece mounted on the table.

The recent rapid progress of integrated logic circuit technology has reached the point where a great number of circuits can be incorporated on a single LSI chip. This advantage has allowed the pulse distributor, the error register, a portion of the D/A converter, and the digital control unit to be assembled as one LSI circuit, such that the positional control circuit is composed of a reduced number of circuit parts, is smaller in size, and is less costly to construct. The LSI circuit is also advantageous in that the circuit components assembled thereon are more reliable in operation. However, LSI circuits sometimes suffer from various failures such as a power supply fault, no clock pulse being supplied, and continued application of a clear signal. When such difficulties arise, the LSI circuit tends to be adversely affected to a large extent since it has a complex circuit arrangement due to an increased rate of integration. A malfunctioning LSI circuit causes a workpiece to be machined in error, with the results that the workpiece which is expensive, will be spoiled, the rate of machining the workpiece will be reduced, and mechanical parts of the machine tool will be damaged.

SUMMARY OF THE INVENTION

It is an object of the present invention to provide a method of diagnosing malfunctions of a servomotor control circuit.

Another object of the present invention is to provide a method of diagnosing malfunctions of a servomotor control circuit having a control unit for supplying commands to the servomotor control circuit.

Still another object of the present invention is to provide a method of diagnosing malfunctions of a servomotor control circuit assembled as an LSI circuit.

A still further object of the present invention is to provide a method of diagnosing malfunctions of a servomotor control circuit without any special diagnostic unit.

A still further object of the present invention is to provide a method of diagnosing malfunctions of a digital circuit section of a servomotor control circuit.

According to the present invention, there is provided a method of diagnosing a servomotor position control circuit including a pulse distributor for carrying out arithmetic operations for pulse distribution based on command data given by a control unit. A position detector generates a positional pulse each time a servomotor rotates through a predetermined angular interval. A error storage unit computes and stores the difference between the number of positional pulses generated by the position detector and the number of distributed pulses generated by the pulse distributor, and a D/A converter converts the difference into an analog output, whereby the servomotor can be controlled by the analog output from the D/A converter. The method comprises the steps of supplying a numerical value from the control unit to the pulse distributor to enable the latter to effect the arithmetic operations while the servomotor is being de-energized, reading a stored content of the error storage unit supplied with the distributed pulses from the pulse distributor into the control unit, and checking the servomotor control circuit for normal and malfunctioning conditions by comparing the stored content, as read by the control unit, with the numerical value.

The above and other objects, features and advantages of the present invention will become more apparent from the following description when taken in conjunction with the accompanying drawings in which a preferred embodiment of the present invention is shown by way of an example.

BRIEF DESCRIPTION OF THE DRAWINGS

FIG. 1 is a block diagram of an arrangement for carrying out a diagnostic method according to the present invention; and FIG. 2 is a circuit diagram, partly in block form, of a D/A converter in the arrangement shown in FIG. 1.

DESCRIPTION OF THE PREFERRED EMBODIMENT

As shown in FIG. 1, a numerical control unit (NC) 11 is composed of a microcomputer comprising a read only memory (ROM) 11a for storing a control program, a random access memory (RAM) 11b for storing processed data and various parameters, and a processor 11c for processing numerical control data based on the control program stored in the ROM 11a and an NC program punched in a paper tape (described later), the ROM 11a, the RAM 11b, and the processor 11c being interconnected by a bus line BUS. The NC program punched in the paper tape 12 is read by a tape reader 13. Digital input and output data transmitted between a machine tool and the numerical control unit 11 are controlled by a power sequence circuit 14.

An LSI circuit 15 incorporates an integrated digital circuit section of a positional control circuit. The LSI circuit 15 comprises a pulse distributor 15a for effecting arithmetic operations for pulse distribution based on motion data given by the numerical control unit 11 to produce distributed pulses Pc, an error register 15b in the form of a reversible counter for computing and storing the difference (error) Er between the number of positional pulses FP generated each time a servomotor rotates through a predetermined angular interval, a register 15c for storing a gain setting supplied from the processor 11c, a multiplier 15d for multiplying the content of the error register 15b with the gain setting stored in the register 15c, an analog switch 15e, and other digital circuits (not shown). The pulse distributor 15a and the register 15c are connected to the bus line BUS through input/output ports (not shown). An analog adder 16 produces a voltage proportional to the error Er. The analog switch 15e and the analog adder 16 jointly comprise a digital-to-analog (D/A) converter. As shown in FIG. 2, the analog adder 16 includes a plurality of registers R1, R2, R4, ... having resistances $2^0 \cdot r$, $2^1 \cdot r$, $2^2 \cdot r$, ..., respectively, and an operational amplifier DAP. The analog switch 15e includes a decoder DEC for decoding an output from the multiplier 15d and a plurality of transistor switches S1 through Si which can be turned on and off by an output from the decoder DEC. When selected ones of the switches S1 through Si are turned on by the output from the multiplier 15d, the analog adder 16 produces a voltage proportional to the output from the multiplier 15. A known speed control circuit 17 comprises a differential amplifier for producing an output proportional to the difference between a speed of rotation of the servomotor as detected by a non-illustrated detector and an output from the analog adder 16, and an amplifier for amplifying an output from the differential amplifier. The servomotor, which is denoted by the reference numeral 18, is operatively coupled to a pulse coder 19 for generating a positional pulse each time the servomotor rotates through a predetermined angular interval. The positional control system shown in FIG. 1 serves to control the position of a movable part of the machine tool only along a single axis such as an X axis.

Operation of the arrangement of FIG. 1 is as follows. When the NC data read out of the tape 12 is positional or path data, the processor 11c computes incremental values ΔX, ΔY and ΔZ along the three-dimensional axes, respectively, according to a numerical control program in the control program stored in the memory 11a, and delivers the computed values to the pulse distributor 15a. Since only the X-axis positional control system is illustrated in FIG. 1, the incremental values ΔX are supplied to the pulse distributor 15a. The pulse distributor 15a is responsive to the supplied incremental values provide performing arithmetic operations for distributed pulses Pc. The distributed pulses Pc are accumulated in the error register 15b until the error Er is no longer zero. As a result, the analog adder 16 generates an analog voltage proportional to the error Er and applies the same to the speed control circuit 17, whereupon the servomotor 18 starts rotating. When the servomotor 18 is rotated, the pulse coder 19 produces a single positional pulse FP each time the servomotor 18 rotates through a predetermined angular interval. The positional pulses FP are successively supplied to the error register 15b to reduce its content. The foregoing operation cycle is repeated to enable the error register 15b to produce a constant normal deviational value as the error Er for rotating the servomotor 18 at a commanded speed and for moving the tool along a commanded path. The numerical control unit 11 stores the incremental values as a remaining amount of movement in a remaining amount storage area (not shown) in the memory 11b. The information from the processor 11c is supplied over a line $l_2$ and the bus line BUS with the distributed pulses Pc from the pulse distributor 15a. Each time a distributed pulse Pc is issued, the content of the processor 11c is counted down, and when the content thereof falls to zero, the processor 11c generates a pulse distribution ending signal DEN to cause the pulse distributor 15a to stop its arithmetic operations for pulse distribution and at the same time cause the tape reader 13 to read next NC data for repeating the above sequence of operations.

In operation, there are certain unwanted situations in which the LSI circuit 15 is not supplied with power, or clock pulses, or the registers are continuously fed with a clear signal. When such problems occur, the LSI circuit 15 tends to malfunction, resulting in a variety of damages. According to the present invention, the foregoing numerical control processing operation is preceded by the step of confirming the operation of the main parts of the positional control circuit to ascertain whether the LSI circuit functions properly prior to energization of the servomotor 18, that is, turning on of the power supply switch for the machine tool.

The above diagnostic process will now be described in more detail. When the numerical control system is powered, or an LSI diagnostic pushbutton on a control board (not shown) is depressed, the processor 11c in the numerical control unit 11 supplies a certain numerical value A to the pulse distributor 15a under the control of a diagnostic program in the control program stored in the memory 11a. The numerical value A is simultaneously stored in a storage region 101 in the memory 11b.

The pulse distributor 15a effects arithmetic operations on the numerical value A for distributing pulses Pc, which are then accumulated in the error register 15b. When pulses Pc equal in number to the numerical value A are produced, the processor 11c produces a pulse distribution ending signal DEN to stop the pulse distribution operation. When the LSI circuit is normal at this time, the error Er is equal to the numerical value A, and when the LSI circuit is not normal, the error Er is less than the numerical value A. More specifically, when there is no power supplied to the LSI circuit 15, the pulse distributor 15a and the error register 15b do not operate, and hence the error Er produced from the error register 15b is indicative of a numerical value other than the numerical value A. When the clock pulses are not supplied, distributed pulses are not generated by the pulse distributor 15a, and hence the error Er from the error register 15b is zero. When a clear signal is supplied, the error Er from the error register 15b is also zero. This holds true when the other circuits malfunction, with the result that the error Er from the error register 15b deviates from the numerical value A.

Upon generation of the pulse distribution ending signal DEN, the processor 11c reads the error Er stored in the error register 15b over a line $l_1$ and the bus line BUS and stores the error Er in a storage region 102 in the memory 11b under the control of the diagnostic program. Thereafter, the processor 11c compares the contents A of the storage regions 101 and 102 with the error Er to ascertain whether the stored value A is equal to the error Er or not, and displays the result of comparison on the control board (not shown). When the stored value A is equal to the error Er, the LSI circuit is determined as being normal; the LSI circuit is supplied with power and clock pulses, and not with a continued clear signal. Then, the numerical control processing is permitted and started. However, when the stored value A is not equal to the error Er, the LSI circuit is judged as malfunctioning or being damaged and the numerical control processing is inhibited. The LSI circuit is then repaired or replaced with another LSI circuit.

While in the foregoing embodiment the numerical control unit 11 produces the pulse distribution ending signal DEN, the pulse distributor 15a may generate a pulse distribution ending signal DEN when it issues a number of pulses corresponding to the incremental value ΔX. With this alternative, the numerical control unit 11 receives the pulse distribution ending signal DEN from the pulse distributor 15a to read the error Er from the error register 15b and effect the foregoing comparison.

The numerical value A has been described as being given under the control of the diagnostic program stored in the memory ROM 11a. However, the numerical value A may be stored as a parameter in the memory RAM 11b. According to this modification, there is no need to store the numerical value A issued to the pulse distributor 15a in the storage region 101 in the memory 11b, and the numerical value A may be read directly from the memory 11b for comparison with the error Er.

With the arrangement of the present invention, as described above, the numerical control processing is preceded by the process of checking the LSI circuit including the digital circuit section in the positional control circuit for its normal or malfunctioning operation. There is no danger of the servomotor operating in error due to any malfunctioning of the LSI circuit, an advantage which prevents the workpiece from being spoiled or the machine tool from being damaged due to an erronuous machining operation.

The foregoing checking process is carried out automatically by the numerical control unit for performing a simplified malfunction checking operation, and no special diagnostic unit needs to be added. The malfunction checking procedure is also simplified by the numerical control unit which effects an LSI checking process similar to ordinary numerical control processing.

Although a certain preferred embodiment has been shown and described in detail, it should be understood that many changes and modifications may be made therein without departing from the scope of the appended claims.

What we claim is:

1. A method of diagnosing a servomotor control circuit, before executing numerical processing, including a servomotor, a control unit for providing a numerical value, a pulse distributor, operatively connected to the control unit, for carrying out arithmetic operations for pulse distribution based on the numerical value provided by the control unit, a position detector, operatively connected to the servomotor, for generating a positional pulse each time the servomotor rotates through a predetermined angular interval, an error storage unit, operatively connected to the position detector and the pulse distributor, for computing and storing the difference between the number of positional pulse generated by the position detector and the number of distributed pulses generated by the pulse distributor, and a D/A converter, operatively connected to the error storage unit, for converting the difference into an analog output, the servomotor being controlled by the analog output from the D/A converter, said method comprising the steps of:
   (a) supplying the numerical value from the control unit to the pulse distributor to enable the pulse distributor to effect the arithmetic operations while the servomotor is in a de-energized state;
   (b) reading a stored content of the error storage unit, supplied with the distributed pulses from the pulse distributor, into the control unit; and
   (c) checking the servomotor control circuit for normal and malfunctioning conditions by comparing the stored content, read into the control unit, with the numerical value.

2. A method according to claim 1, further comprising, after said checking step (c), the steps of:
   (d) permitting numerical control of the servomotor by the control unit when the servomotor control circuit has been determined as being in a normal condition; and
   (e) inhibiting numerical control of the servomotor by the control unit when the servomotor control circuit has been determined as being in a malfunctioning condition.

3. A method according to claim 1, wherein the control unit includes a memory and wherein said step (b) comprises the substep of storing the stored content into the memory in the control unit.

4. A method according to claim 1, further comprising the step, before said step (a), of detecting turn-on of a power supply to the control unit.

5. A method according to claim 1, further comprising the step, before said step (a), of detecting the depression of a diagnostic pushbutton.

6. A method according to claim 1, wherein said step (a) comprises the substep of detecting the completion of the distributed pulses by the pulse distributor.

7. A method of diagnosing a servomotor control circuit, before executing numerical processing, including a servomotor, a control unit, operatively connected to the servomotor, for providing numerical data, a pulse distributor, operatively connected to the control unit, for providing distributed pulses, and an error storage unit, operatively connected to the pulse distributor, for storing a difference signal, said method comprising the steps of:
   (a) supplying the numerical data from the control unit to the pulse distributor to enable the pulse distributor to effect an arithmetic operation while the servomotor is de-energized;
   (b) reading a stored content of the error storage unit, supplied with the distributed pulses from the pulse distributor, into the control unit; and
   (c) checking the servomotor control circuit for normal and malfunction conditions by comparing the stored content read into the control unit with the numerical data.

8. A method according to claim 7, further comprising, after said checking step (c), the steps of:
   (d) permitting numerical control of the servomotor by the control unit when the servomotor control circuit has been determined as being in a normal condition; and
   (e) inhibiting numerical control of the servomotor by the control unit when the servomotor control circuit has been determined as being in a malfunctioning condition.

* * * * *

UNITED STATES PATENT AND TRADEMARK OFFICE
CERTIFICATE OF CORRECTION

PATENT NO. : 4,496,889

DATED : JANUARY 29, 1985

INVENTOR(S) : HIROOMI FUKUYAMA ET AL.

It is certified that error appears in the above-identified patent and that said Letters Patent is hereby corrected as shown below:

Col. 3, line 54, "provide" should be --for--; and "for" should be --to--;
line 55, before "distributed" (first occurrence) insert --provide--.

Col. 4, line 6, "$1_2$" should be --$\ell_2$--;

line 17, "power," should be --power--;

line 62, "$1_1$" should be --$\ell_1$--.

Signed and Sealed this

Sixth Day of August 1985

[SEAL]

Attest:

DONALD J. QUIGG

Attesting Officer     Acting Commissioner of Patents and Trademarks